United States Patent [19]

Grott et al.

[11] 4,014,578
[45] Mar. 29, 1977

[54] VARIABLE METERING DROP VALVE

[75] Inventors: Charles N. Grott, St. Louis; Dallas W. Rollins, St. Charles, both of Mo.

[73] Assignee: ACF Industries, Incorporated, New York, N.Y.

[22] Filed: June 24, 1975

[21] Appl. No.: 589,942

[52] U.S. Cl. .................................. 302/52; 222/505
[51] Int. Cl.² .......................................... B65G 53/46
[58] Field of Search ................. 302/52; 214/83.28; 222/505, 508; 105/280, 283, 284

[56] References Cited
UNITED STATES PATENTS

| | | | |
|---|---|---|---|
| 3,268,267 | 8/1966 | Nelson | 302/52 |
| 3,583,769 | 6/1971 | Mundinger | 302/52 |
| 3,627,383 | 12/1971 | Adler | 302/52 |
| 3,632,174 | 1/1972 | Miller | 302/52 |
| 3,724,909 | 4/1973 | Adler | 302/52 |
| 3,778,114 | 12/1973 | Carney et al. | 302/52 |

Primary Examiner—Evon C. Blunk
Assistant Examiner—Jeffrey V. Nase
Attorney, Agent, or Firm—Henry W. Cummings

[57] ABSTRACT

A pneumatic outlet is provided in which a discharge conduit is affixed to spaced outlet slope sheets and to outlet end sheets. A valve member is movable vertically in the discharge conduit to assume a fully closed and a plurality of open positions. The extent of valve opening may vary from a closed position on one side of the outlet to a partially or fully open position on the other side, linearly across the outlet. Operating mechanisms for raising and lowering the valve member are provided on opposite sides of the outlet, preferably comprising lift rods which engage the valve member. A plurality of operating mechanisms for raising and lowering the valve member are disclosed including screw jack assemblies and cam and cable assemblies. The operating mechanism preferably includes transverse linkages along the outlet operating the valve member from the opposite side of the outlet from either side of the outlet. These transverse linkages may include a chain and sprocket assembly, a shaft and gear arrangement, or a cam and cable assembly.

34 Claims, 16 Drawing Figures

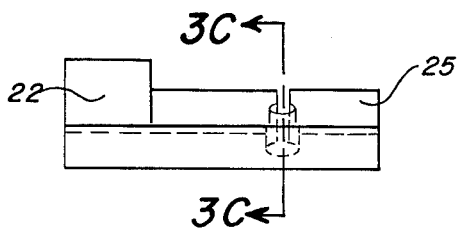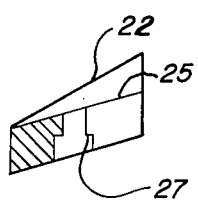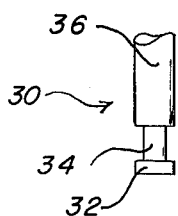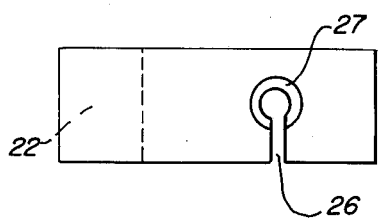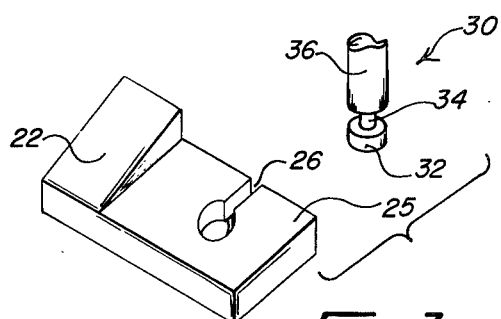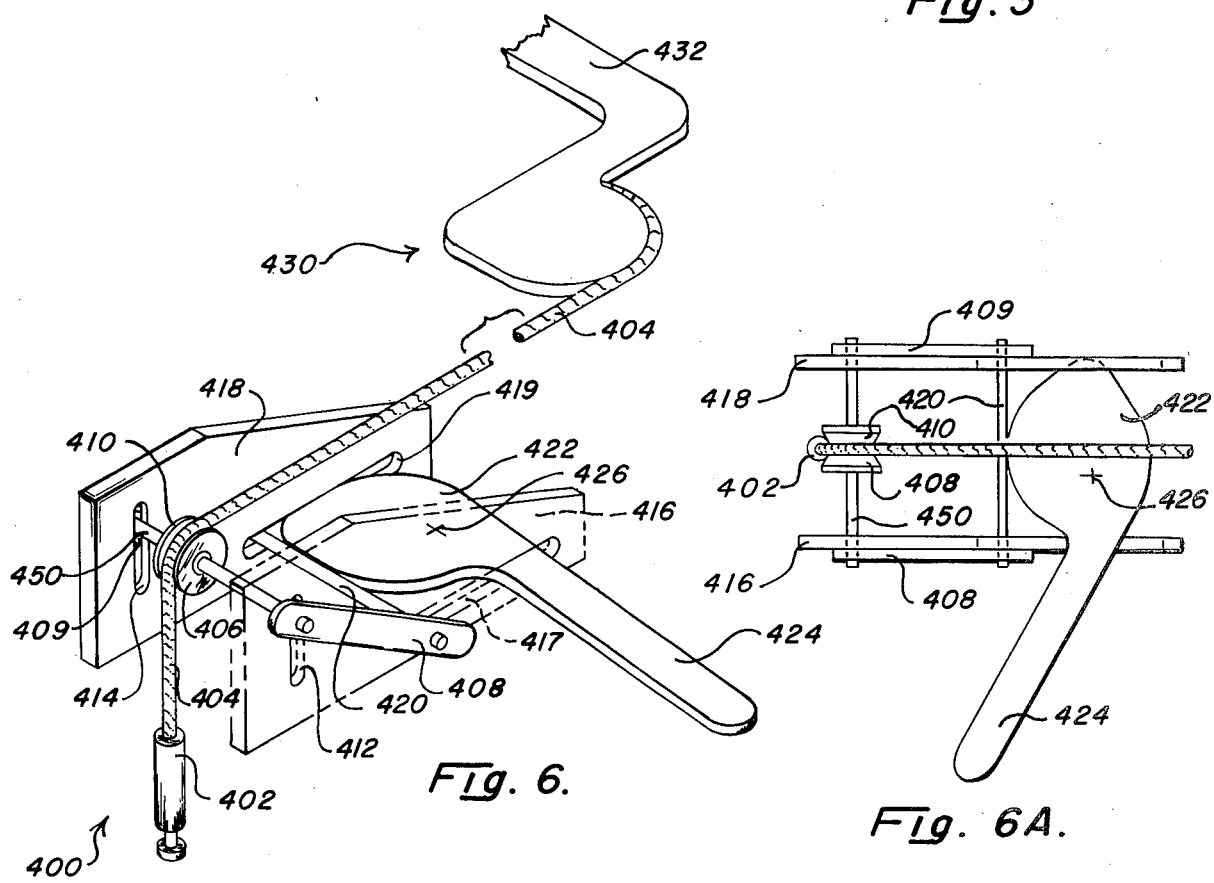

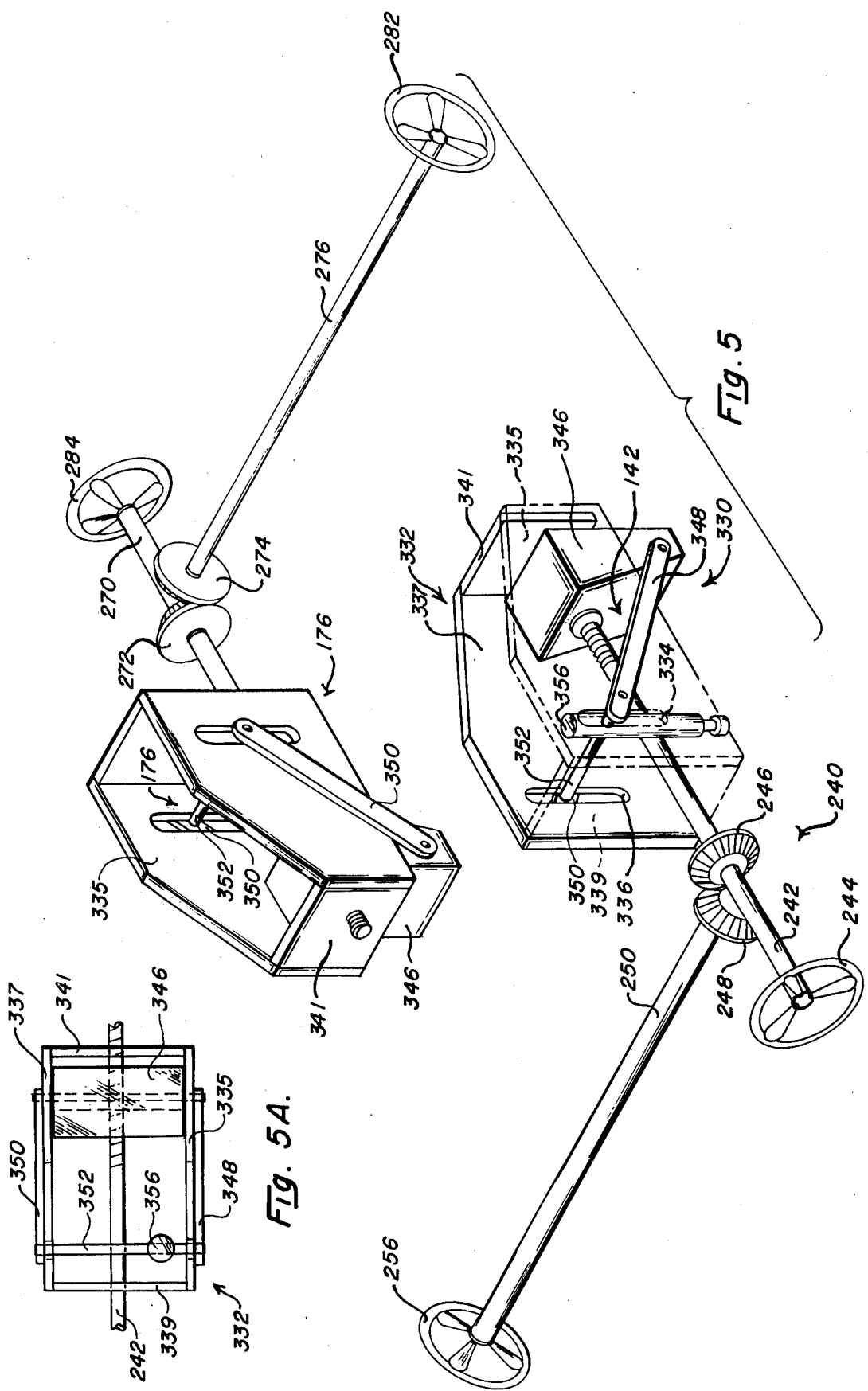

VARIABLE METERING DROP VALVE

BACKGROUND OF THE INVENTION

This invention relates to pneumatic outlets for use in unloading hopper type containers, including but not limited to railway hopper cars. One currently used technique for unloading such hoppers is the so-called "tube within a tube" or "valve within a tube". Description of the construction of these respective pneumatic outlets is found respectively in U.S. Pat. Nos. 3,194,420 and 3,778,114. The latter concept, the valve within a tube, has the advantage that usually the outlet does not have to be disassembled in switching from one lading to another.

However, in both of these constructions the product hose between the hopper outlet and the container into which the lading is being unloaded must deflect angularly during adjustment of the valve during unloading. A rather high operating torque on the part of the operator is required to make these adjustments. The problem has been found to be more acute during cold weather when the metal parts have contracted somewhat.

A second problem which has been encountered with the tube within a tube and the valve within a tube outlets has been the operation of the outlet after the outlet has been impacted; for example, in the case of a railway hopper car, if the outlet contacts something in transit on the track or near the track. With the close tolerances required in these constructions, the tube or valve often will not operate at all. Thus the entire outlet must be removed from the hopper to unload the lading. This requires considerable operator time and may hold the container up from use in other services. Thus inoperability of the tube in a tube and valve in a tube due to impact can be expensive.

It is to be borne in mind that current standards in the railway industry require that any pneumatic outlet introduced must be entirely operable from one side of the car. This may also be advantageous in container outlets and in fixed bin installations. This means that the operator must be able to unload first the side opposite to the operating side and then the operating side to avoid short circuiting when an air space occurs in the pneumatic system and thus the lading is no longer conveyed by the pneumatic system. Thus the outlet must have the capability while the operator is standing on any given side of the outlet, of allowing the far side of the outlet to be unloaded first. It will be apparent to those skilled in the art that this requires a translating mechanism for opening the outlet from the opposite side of the outlet while maintaining the near side of the outlet closed.

SUMMARY OF THE INVENTION

It is an object of the present invention to provide a pneumatic outlet in which the torque required for valve adjustment during unloading is reduced from that required in the tube in a tube and valve in a tube outlets.

It is another object of the present invention to provide a pneumatic outlet which will operate at least in part when the outlet has been impacted so that unloading of the lading can take place even after such impact.

It is another object of the present invention to provide a pneumatic outlet which may be unloaded from either side of the outlet during which unloading, the opposite side of the outlet may be unloaded first.

A pneumatic outlet is provided in which a discharge conduit is affixed to spaced outlet slope sheets and to outlet end sheets. A valve member is movable vertically in the discharge conduit to assume a fully closed and a plurality of open positions. The valve member has valve portions on each side of the outlet. The extent of valve opening may vary from a closed position on one side of the outlet to a partially or fully open position on the other side, linearly across the outlet. Operating mechanisms for raisisng and lowering the valve member are mounted on opposite sides of the outlet, preferably comprising lift rods which engage the valve member. The operating mechanisms include transverse linkages for operating the valve portion on the opposite side of the outlet from either side of the outlet. The operating mechanisms for raising and lowering the valve member include screw jack assemblies, and cam and cable assemblies. The transverse linkages may include a chain and sprocket assembly, a shaft and gear arrangement, or a cam and cable assembly.

THE DRAWINGS

FIG. 3 is an exploded perspective view of the mechanism for raising and lowering the valve located at opposite ends of the valve;

FIG. 3A is a bottom view of the valve illustrating the lift rod engagement portion;

FIG. 3B is a side elevational view of the end portion of the valve;

FIG. 3C is a sectional view looking in the direction of the arrows along the line 3C—3C in FIG. 3B;

FIG. 3D is a view of a lift rod which may be utilized in the outlet of the present invention;

FIG. 5 is a schematic perspective view of an alternative screwjack operating mechanism which may be utilized in the outlet of the present invention, with the outlet removed for clarity;

FIG. 5A is a plan view of operating mechanism shown in FIG. 5;

FIG. 6 is a schematic perspective view of still another operating mechanism which may be utilized in the pneumatic outlet in the present invention; and FIG. 6A is a plan view of the operating mechanism shown in FIG. 6.

DESCRIPTION OF PREFERRED EMBODIMENT

Figure 1:
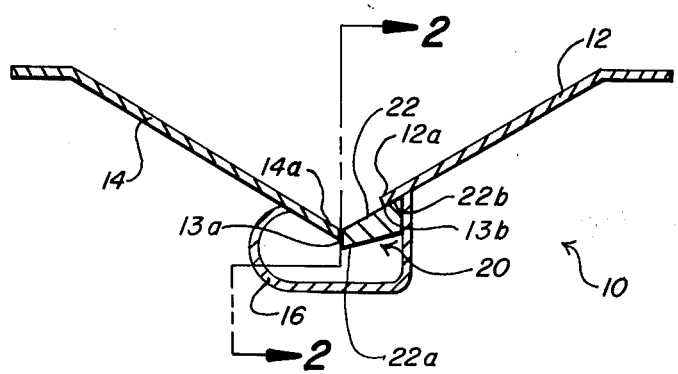
FIG. 1 is a longitudinal sectional view through the outlet of the present invention.

The outlet of the present invention is indicated in the drawings generally at 10. The outlet comprises spaced outlet slope sheets 12 and 14. Preferably one slope sheet terminates above the other. In FIG. 1 slope sheet 12 is indicated terminating higher than slope sheet 14. The discharge conduit portion 16 is then integrally affixed to the respective sheets 12 and 14 with mechanical fasteners or by welding. It will also be apparent that slope sheet 14 preferably extends partly into the discharge conduit as indicated at 14a.

Similarly it is preferred to provide a slight continuation of slope sheet 12 indicated at 12a into the discharge area. A valve member indicated generally at 20 is provided for generally vertical movement within the discharge conduit 16. Preferably the valve member 20 comprises an inclined surface 22 which at one end portion engages the slope sheet extension 14a as indicated at 22a and upper inclined portion 22b engages the extension 12a of slope sheet 12. Valve member 20 is contoured to make a sealing fit with the respective outlet slope sheet 12 and 14. If desired appropriate sealing means such as sealing strips 13a and 13b may be mounted on the slope sheet 12 and/or 14. Alternatively appropriate sealing strips may be mounted upon the valve member 20.

Figure 2A:
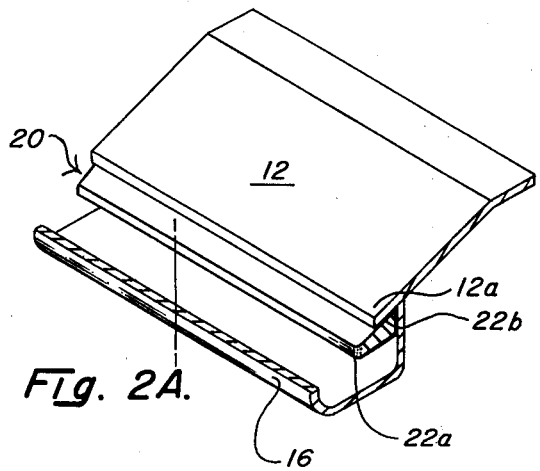
FIG. 2A is a perspective view looking in the direction of the arrows along the line 2—2 in FIG. 1 illustrating the valve in closed position.

FIGS. 1 and 2A show the valve member 20 in the fully closed position in which the valve member engages the slope sheets 12 and 14 across the entire transverse extent of the outlet.

Figure 2B:
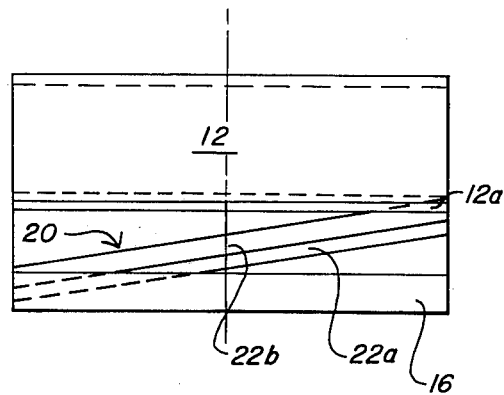
FIG. 2B is a sectional view looking in the direction of the arrows along the line 2—2 in FIG. 1 illustrating the valve with one side only in the full open position.

FIG. 2B illustrates the valve member 20 wherein one side of the outlet is in the full open position and the other side is in the closed position. It will be apparent that in such open positions, the extent of the outlet opening varies linearly transversely across the outlet from the closed end.

Figure 2C:
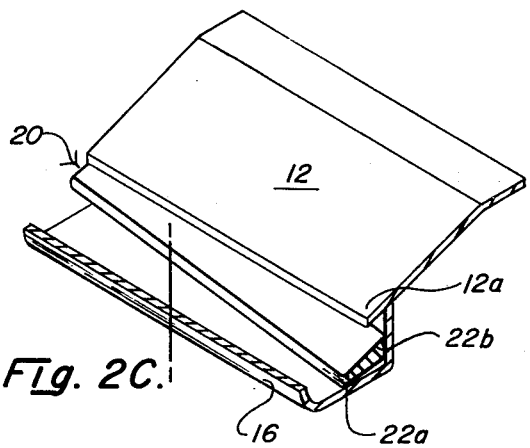
FIG. 2C is a perspective view looking in the direction of the arrows along the line 2—2 in FIG. 1 illustrating the valve with the opposite side in the full open position.
Figure 2D:
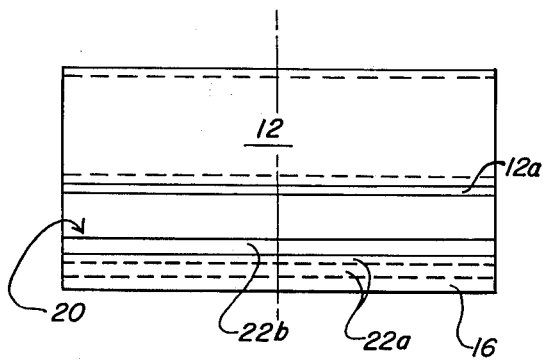
FIG. 2D is a sectional view looking in the direction of the arrows along line 2—2 in FIG. 1 illustrating the valve in the full open position with both sides open.

FIG. 2C illustrates the outlet opening from the opposite end. It will be apparent that in FIGS. 2B and 2C the outlet is open to a small extent on the unopened side of the car. However, this small amount of opening is not considered to be sufficient to result in any short circuiting of the outlet during the unloading. The full open position FIG. 2D is utilized at the end of the unloading when it is desired to be certain that all of the lading has been removed from the outlet.

As illustrated in FIGS. 3–3D valve member 22 is raised and lowered by means of a lift rod mechanism indicated generally at 30. In order to receive the lift rod mechanism the valve member 22 at each end portion thereof is provided with a lift rod receiving portion 25. The lift rod receiving mechanism comprises a slot 26 into which the lift rod 30 is inserted. The lift rod 30 is provided with a head 32 adapted to engage a counterbore surface 27 in slot. A portion of reduced diameter 34 is provided on the lift rod 30 and a lifting and operator engagement portion 36 is also provided.

It will be also apparent to those skilled in the art that the lift rod may be held in place on the valve member with other arrangements, for example, mechanical fasteners which may be removed to allow removal of the valve through the conduit outlet. Operating means are then affixed to the respective lift rods on opposite ends of the outlet to raise and lower one or both sides of the outlet valve.

Figure 4:
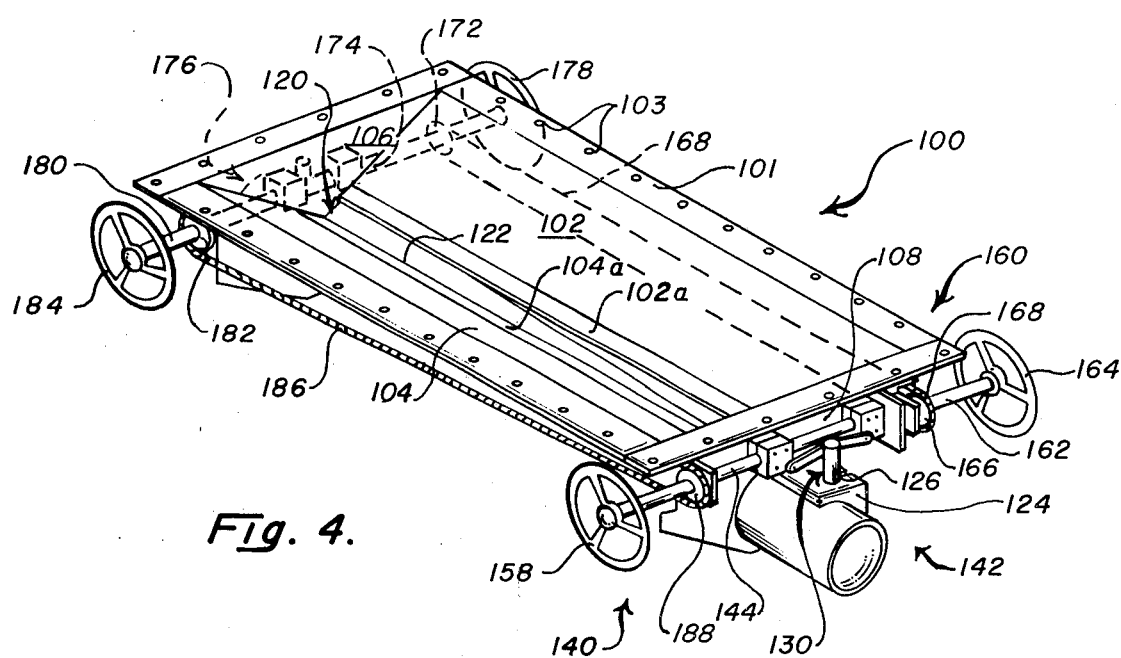
FIG. 4 is a perspective view of the pneumatic outlet of the present invention and illustrating one operating mechanism therefor.

One operating mechanism for raising and lowering the lift rods is illustrated in FIG. 4. In this embodiment a pneumatic outlet is indicated in the drawings generally at 100. This outlet comprises outlet slope sheets 102 and 104 and outlet side sheets 106 and 108. A suitable mounting frame 101 is provided which may have openings therein 103 to facilitate mounting the same on hoppers of a railway car outlet, overland truck hoppers or hopper type containers which may be utilized for lading transport.

As described in regard to FIG. 1, the valve member 120 comprises a transversly extending valve portion 122 which engages slope sheet 102 and extensions 104a of slope sheet 104. Valve member 120 further comprises an operator engagement portion 124 which as described above may comprise a slot 126 counterbored into which lift rod 130 is inserted.

Figure 4A:
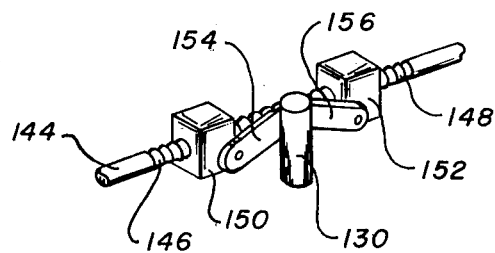
FIG. 4A is a detailed perspective view illustrating the screwjack operating mechanism shown in FIG. 4.

An operating mechanism for operating the outlet from either side of the car is indicated generally at 140. This operating assembly may comprise a screwjack 142 comprising a shaft 144 threaded on one portion thereof with right hand threads 146 (FIG. 4A) and at another portion 148 with left hand threads. Blocks 150 and 152 are threadably engaged to the threaded portions respectively 146 and 148. Blocks 150 and 152, respectively have integrally affixed thereto operating arms 154 and 156, each of which engages the lift rod 130. An operating handle 158 (FIG. 4) is preferably provided and it will be apparent to those skilled in the art that upon rotating the shaft 144 in one direction the lift rod will be raised and if the shaft is rotated in the opposite direction it will be lowered. Thus the right hand side of the outlet valve in FIG. 4 indicated at 124 may be raised and lowered with this portion of the operating assembly.

However, means must be provided for raising and lowering the left hand side of the outlet valve indicated at 126 in FIG. 4. Means for raising and lowering the opposite side of the outlet are indicated in FIG. 4 generally at 160. This means comprises a shaft 162 preferably having a handle 164 and a sprocket mounted thereon 166. A chain 168 is provided which engages sprocket 166 and a sprocket shown dotted at 172 affixed to a shaft 174 on the opposite side of the car. This shaft 174 is affixed to a screwjack assembly indicated generally and schematically at 176 which operates in the same way as the screwjack assembly 142. Screwjack assembly 176 raises and lowers the left hand portion 126 of valve member 122.

It will thus be apparent that an operator standing on the right hand side shown in FIG. 4 may raise and lower the right hand portion of the valve 124 by means of screwjack assembly 142, and may independently by means of the handle 164 and chain 168 likewise operate the left hand side of the valve 126 by means of the screwjack assembly 176. Thus if the outlet is mounted on a railway car the operator need not move to the other side of the car to operate the left hand portion of the valve. By appropriate rotation of shafts 144 and 162 from the right hand side of the outlet, the valve member may be moved into one side open position shown in FIG. 2B, the other side open position shown in FIG. 2C or the full open position shown in FIG. 2D.

If the operator is on the left hand side of the outlet as shown in FIG. 4, the operator can likewise operate both sides of the outlet from this side. The operator can raise and lower the left hand side of the outlet by means of the handle 178 affixed to the shaft 174 and screwjack assembly 176. A second shaft 180 is provided on this side of the car having a sprocket thereon 182 and preferably a handle 184. A chain 186 engages the sprocket 182 and also engages a sprocket 188 on shaft 144. Thus from the left hand side of the outlet as shown in FIG. 4 the operator may also operate screwjack assembly 142 by means of shaft 180. Thus the operator can independently raise and lower the left hand portion 126 and the right hand portion 124 or both portions from the left hand side of the outlet.

It will be apparent to those skilled in the art that other operating assemblies may be utilized to translate the shaft rotational movement from one side of the outlet to the other. For example, as shown in FIG. 5, a beveled gear operating assembly indicated at 240 may be provided. In this embodiment a shaft 242 is provided having a handle 244 and a first beveled gear 246. This beveled gear engages a second beveled gear 248 which is integral with a shaft 250 which extends across the outlet and is terminated at the opposite side of the outlet with handwheel 256. A second shaft 270 is equipped with handwheel 284 on the opposite side of the outlet and is connected to beveled gears 272, 274 and to a shaft 276 which is terminated with handwheel 282 which is utilized to provide means for operating the outlet from either side. Thus an operator on the left hand side of the outlet can operate both the left hand and the right hand side of the outlet. Shaft 242 is utilized to operate a suitable lift rod operating mechanism such as the screwjack assembly 142 located on the right hand side of the car. Shaft 270 is utilized to operate a suitable lift rod operating mechanism such as the screwjack assembly 176 on the left hand side of the car. Thus an operator may stand on either side of the car and operate both the left hand and the right hand portion of valve member 122.

An alternative screwjack left rod operating mechanism is also illustrated in FIG. 5. The screwjack mechanism 330 comprises a housng 332 having slots therein 334 and 336 respectively in face plates 335 and 337. The housing preferably further comprises end plates 339 and 341. A suitable shaft 242 engages a follower block 346. Block 346 is equipped with female threaded surfaces which enables translation through rotation of shaft 242. Follower block 346 extends below the face plates 335 and 337. The follower block is connected to links 348 and 350 which are connected to cross link 352 which engages lift rod 356. Rotation of shaft 242 will urge follower block 346 to move laterally between face plates 335 and 337. For example, movement from left to right in FIG. 5A will cause links 348 to move from left to right and will cause lift rod 356 to be lowered. Similarly, rotation of shaft 242 in the opposite direction will result in movement of follower block 346 from right to left and will raise lift rod 356. Lift rod 356 will open and close the right hand side of valve member 122 in FIG. 4. Either operating assembly 140 or 240 or other appropriate operating assembly may be utilized to provide means for operating screwjack assembly 330 from the left hand side of the car. A screwjack assembly similar to screwjack assembly 330 is located on the left hand side of the car as viewed in FIG. 5. Again either operating assembly 240 or operating assembly 140 or another suitable operating assembly is utilized to raise and lower screwjack assembly 330 on the left hand side of the car. Thus it will be apparent that modified screwjack assembly 330 may be operated from either side of the car by an operator standing only on one side of the car.

Still another operating assembly for raising and lowering respective sides of the valve member 122 is shown in FIG. 6. In this embodiment the operating assembly is indicated generally at 400. A lift rod for operating the right hand side of the outlet is shown in the drawing as 402. A cable 404 is provided which will raise the lift rod 402. Cable 104 passes over a pulley 406. A pair of links 408 and 410 engage cross link 450 which serves as axle for pulley 406 and this link moves within slots 412 and 414 respectively in plates 416 and 418. Links 408 and 409 engage follower 420 which translates in slots 417 and 419. A cam 422 having an appropriate operating handle 424 is mounted for rotational movement about a center line 426. Cam 422 is between plates 416 and 418 by respective slots 417 and 419. Counterclockwise movement of cam 422 by means of handle 424 will result in movement of follower 420 from left to right in FIG. 6 which will lower pulley 410 and lift rod 402 in the right hand side of valve member 122 in FIG. 4. Clockwise movement of cam 422 from previously executed counterclockwise rotation will raise lift rod 402. Cable 404 is connected to another cam member 430 on the opposite side of the car similar to cam 422 as shown in FIG. 6. Movement of the cam 430 by means of handle 432 in a counterclockwise direction will raise lift rod 402 and movement of handle 432 in the clockwise direction will lower lift rod 402. Thus lift rod 402 may be raised and lowered from either side of the outlet.

It will further be apparent that if another assembly 400 is located on the left hand side of the car, the left hand portion of valve member 122 may be raised and lowered thereby. Furthermore, a cable may be provided extending from the left side of the outlet the right side of the outlet operated by a cam and lever on the right side of the outlet similar to cam lever 430 and 432 respectively whereby the assembly on the left hand side of the car may be raised and lowered from the right hand side. Thus an operator may stand on either side of the outlet and operate both sides of the valve member 122 from either side of the car.

What is claimed is:

1. A pneumatic hopper outlet comprising: spaced outlet slope sheets inclined downwardly toward each other; said outlet slope sheets being spaced from one another at the lower ends thereof to define a discharge opening; side sheets joining said outlet slope sheets at opposite sides of said outlet; an outlet conduit engaging the lower portion of each of said outlet slope sheets and said side sheets; a rigid valve member including valve portions on each side of the outlet located within said conduit and being movable within said conduit in a generally vertical direction; said valve member in one position engaging the lower ends of said outlet slope sheets and closing the discharge opening entirely across said outlet; said valve member being movable to a plurality of open positions to unload said outlet, and being movable to a closed position on a first side of the outlet and to a plurality of open positions on a second side of the outlet opposite to said first side, while said valve member is maintained in the closed position on the first side of the outlet; the extent to which said valve member is opened on said second side varying linearly to the extent that the valve portion on said second side is lowered from said ends of said outlet slope sheets on said second side; operating means located on each side of the outlet for raising and lowering the valve portion on the adjacent side of the outlet; and translating means located externally of said conduit extending across the outlet for raising and lowering the valve portion on the opposite side of the outlet from the adjacent side of the outlet.

2. A pneumatic outlet according to claim 1 wherein said sealing means are provided which is engaged by said valve member in closed position.

3. A pneumatic outlet according to claim 1 wherein one of said outlet slope sheets terminates at a point above the opposite outlet slope sheet.

4. A pneumatic outlet according to claim 3 wherein said valve member is vertically inclined.

5. A pneumatic outlet according to claim 4 wherein the angle of inclination of said valve member approximates the angle of inclination of the upper outlet slope sheet.

6. An outlet according to claim 1 wherein said operating means include lift rods on opposite sides of the outlet.

7. A pneumatic outlet according to claim 6 wherein said lift rods are held in engagement with said valve member with mechanical fasteners.

8. A pneumatic outlet according to claim 7 wherein said lift rods engage respective slots in said valve member.

9. A pneumatic outlet according to claim 8 wherein the slots in said valve member are countersunk and wherein a head on said lift rod engages the countersunk portion of the valve member.

10. A pneumatic outlet according to claim 6 wherein said operating means includes a cam and cable arrangement.

11. A pneumatic outlet according to claim 6 wherein said operating means includes a screwjack mechanism.

12. A pneumatic outlet according to claim 11 wherein said screwjack assembly is acutated by a single follower block.

13. A pneumatic outlet according to claim 11 wherein said screwjack assembly is actuated by a pair of follower blocks.

14. A pneumatic outlet according to claim 6 wherein the translating means comprises a cable extending transversely across the outlet.

15. A pneumatic outlet according to claim 14 wherein the said cable is actuated by a cam.

16. A pneumatic outlet according to claim 15 wherein said operating means comprise a cam and cam follower.

17. A pneumatic outlet according to claim 16 wherein handle means are provided for operating the respective cams on either side of the outlet.

18. A pneumatic outlet according to claim 6 wherein the operating means comprise links engaging said lift rods mounted for vertical movement within slots provided in fixed plates and means for moving said links vertically.

19. A pneumatic outlet according to claim 18 wherein the means for moving said links comprises a cam which engages a follower cross link.

20. A pneumatic outlet according to claim 18 wherein the means for moving said links comprises a follower block engaged by a threaded shaft.

21. A pneumatic outlet according to claim 1 wherein the operating means comprises an operating shaft located on each side of the outlet.

22. A pneumatic outlet according to claim 21 wherein said translating means comprises a chain engaging sprockets located on the respective shafts.

23. A pneumatic outlet according to claim 21 wherein the translating means comprises a shaft extending across the outlet which engages gears on the respective sides of the outlet.

24. A pneumatic outlet according to claim 23 wherein said gears comprise bevel gears.

25. A pneumatic outlet according to claim 1 wherein said operating means comprise a screwjack assembly.

26. A pneumatic outlet according to claim 25 wherein a screwjack assembly is provided on each side of the outlet to raise and lower the valve member on each side of the outlet.

27. A pneumatic outlet according to claim 26 wherein an operating shaft is provided on each side of the outlet to operate the respective screwjack assemblies.

28. A pneumatic outlet according to claim 27 wherein the operating shafts for said screwjack assemblies are provided with means for rotation of the said shafts together.

29. A pneumatic outlet according to claim 28 wherein the means for concurrent rotation of said shafts comprise a chain and sprocket.

30. A pneumatic outlet according to claim 28 wherein the means for providing concurrent rotation of the respective shafts comprises a shaft and gear arrangement.

31. A pneumatic outlet according to claim 30 wherein the gear arrangement comprises a bevel gear.

32. A pneumatic outlet according to claim 28 wherein the shafts operating said screwjack assemblies comprises threads which engage a follower block to raise and lower said lift rod.

33. A pneumatic outlet according to claim 28 wherein the shafts used to raise and lower said screwjack assembly comprises right hand and left hand threads, each of which threads engage a follower block to raise and lower said lift rod.

34. A pneumatic hopper outlet comprising: spaced outlet slope sheets inclined downwardly toward each other; said outlet slope sheets being spaced from one another at the lower ends thereof to define a discharge opening; side sheets joining said outlet slope sheets at opposite sides of said outlet; an outlet conduit engaging the lower portion of each of said outlet slope sheets and said side sheets; a rigid outlet valve member includng valve portions on each side of the outlet located within said conduit and being movable within said conduit in a generally vertical direction; and valve member in one position engaging the lower ends of said outlet slope sheets and closing the discharge opening entirely across said outlet; said valve member being movable to a plurality of open positions to unload said outlet, and being movable to a closed position on a first side of the outlet and to a plurality of open positions on a second side of the outlet opposite to said first side, while said valve member is maintained in the closed position of the first side of the outlet; the extent to which said valve member is opened on said second side varying linearly to the extent that the valve portion on said second side is lowered from the lower ends of said outlet slope sheets on said second side; operating means including a screw jack located on each side of the outlet for raising and lowering said valve member; and translating means extending from each side of the outlet across the outlet located outside of said conduit for raising and lowering the valve portion on the opposite side of the outlet from the adjacent side of the outlet, whereby said valve member may be operated from either side of the outlet.

* * * * *